April 27, 1965 R. RAUTER 3,180,760
METHOD OF PRODUCING SECONDARY DRY CELLS WITH LEAD
ELECTRODES AND SULFURIC ACID ELECTROLYTE
Filed March 3, 1961
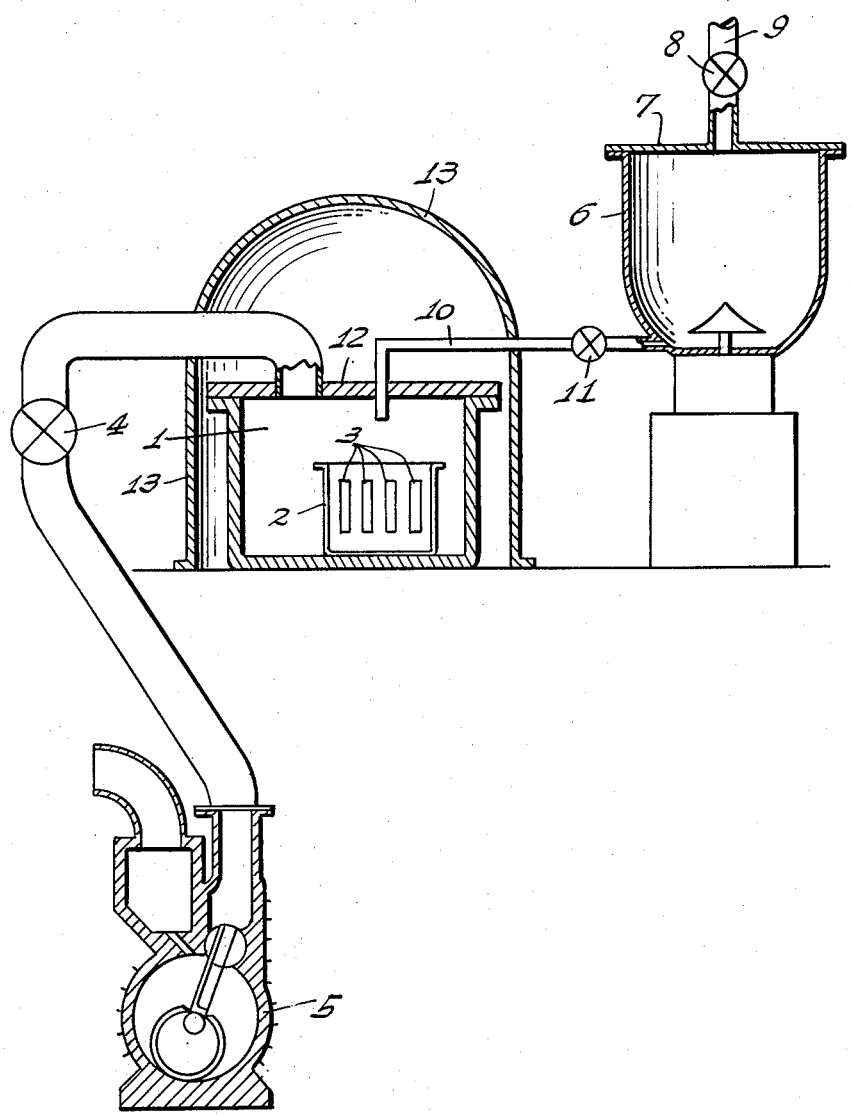
INVENTOR.
RUDOLF RAUTER
BY
AGENT 3,180,760
METHOD OF PRODUCING SECONDARY DRY CELLS WITH LEAD ELECTRODES AND SULFURIC ACID ELECTROLYTE
Rudolf Rauter, Munich, Germany, assignor to Marc, Inc., Chicago, Ill., a corporation of Illinois
Filed Mar. 3, 1961, Ser. No. 93,265
Claims priority, application Germany, Mar. 5, 1960, R 27,486
11 Claims. (Cl. 136—6)

The invention relates to a method of producing dry batteries which contain a mixture of sulfuric acid and silicic acid as dry electrolyte. It is known in dry batteries with lead electrodes to use dry electrolyte composed of sulfuric acid and silicic acid. The silicic acid used for this purpose was first produced by treating silicates with alkalis in aqueous phase. Owing to the alkali residues, which can never be removed entirely and which are extremely detrimental for batteries, such dry electrolytes have, however, scarcely been used at all. To avoid the detrimental effects of the alkali content it is also known to produce a colloidally dispersed silicic acid for use in the dry electrolytes, by various processes such as mentioned in British Patent No. 785,848, including the hydrolysis of silicon tetrachloride. This colloidal silicic acid is free from alkali, has a degree of purity of 99.9% and can be produced in particle sizes measured in microns, as for example of about 5 to 20µ or less as given in the identified British patent. Dry electrolytes which consist of sulfuric acid and such a colloidal silicic acid produced from silicon tetrachloride, give much better results than dry electrolytes containing silicic acid which is obtained by the alkali treatment of silicates, as stated in the British patent identified. However, even the dry electrolytes improved in this manner are open to numerous objections which oppose their use on a large scale. These dry electrolytes shrink with ageing, with the result that the activated composition is covered, a considerable loss in voltage takes place, a sulfating of the electrodes and therefore a loss of activity occurs and self-discharge ensues. It has already been endeavoured to overcome these objections by introducing into the electrolyte additions of aluminium hydroxide, beryllium sulfate, pure soot or a skeleton of glass fibres or the like. Nevertheless, it has been found that such additions are rather injurious than advantageous. A skeleton of glass fibres or the like unavoidably introduces impurities, especially of an alkaline nature, into the electrolyte so that the electrolyte is also considerably worsened thereby.

Now the object of the invention is to overcome these objections without additions to the electrolyte and without the necessity of using a skeleton.

The method according to the invention for the production of dry cells with lead electrodes and sulfuric acid electrolyte consisting of sulfuric acid and colloidal silicic acid obtained from silicon chloride is characterized in that the formed electrodes inserted in the cell housing are subjected, immediately following a preliminary treatment in diluted sulfuric acid, to a vacuum for an effective period of time, as at least 15 minutes with continuous exhaustion of the gases given off, and that the prepared admixture-free, thixotropic electrolyte consisting of sulfuric acid and colloidally dispersed silicic acid with a high degree of purity is reduced to liquid state in a high-speed mixer and introduced into the cell housing placed in an evacuated space.

By the method according to the invention a dry battery is produced in which extremely intimate contact exists between the electrolyte and the electrodes. The electrolyte has no longer any tendency to shrink. Besides overcoming the objections inherent in the former dry batteries, the batteries according to the invention also possess the advantage that, even in the case of overcharging, no strong gas formation takes place which would make it necessary to top-up with distilled water and which might be extremely dangerous in the case of a gas and liquid-proof housing.

Although it is already known to draw the electrolyte in to a battery jar containing the electrodes under the action of a temporary vacuum, filling the electrolyte under vacuum in this manner is not capable of producing the special effects of the vacuum treatment of the plates themselves for an effective time period directly following a pre-treatment with sulfuric acid.

The sulfuric acid pre-treatment of the electrodes directly preceeding the vacuum treatment can, according to one embodiment of the invention, be the forming operation in diluted sulfuric acid itself. The vacuum treatment of the electrodes is then introduced immediately following the pouring off of the forming acid. If, however, the electrodes are stored in formed state, when it is a question of producing the finished dry cell, the formed dry electrodes for the sulfuric acid pre-treatment are, according to the invention first additionally dipped in diluted sulfuric acid and the vacuum treatment then follows immediately after this additional sulfuric acid pre-treatment.

An embodiment of the invention is hereinafter described with reference to the accompanying drawing.

The apparatus for carrying out the method according to the invention and shown diagrammatically in the accompanying drawing comprises a vacuum chamber 1 into which the battery housing 2 containing the electrodes 3 is placed. The vacuum chamber is connected through the intermediary of a shutoff valve 4 to a vacuum pump 5 which is in the example illustrated a mechanical pump but which might equally well be a vacuum pump of some other type, for example a liquid or steam ejector pump or the like. A high-speed mixer 6, provided for the pre-treatment of the electrolyte, is also connected to the vacuum chamber 1. This high-speed mixer 6 is a highly efficient, high-speed mixer of conventional type. It is closed at the top by a lid 7. In this lid 7 a connecting piece 9 closable by a valve 8 is provided and a vacuum pump or a feed conduit for inert gas or the like can be connected to this connecting piece. The connection between the high-speed mixer 6 and the vacuum chamber 1 preferably consists of a flexible conduit 10 which is closable by means of a valve 11 and leads into the lower part of the high-speed mixer 6.

With this apparatus the method according to the invention is carried out in the following manner:

The electrodes 3 are placed in the dry cells in the usual way for producing dry batteries and connected up with their terminal lugs in the conventional manner. If it is a case of freshly produced battery electrodes, these electrodes 3 are first formed in the housing the usual manner with diluted sulfuric acid. At the end of the forming procedure, the forming acid is poured off and the housing 2 containing the electrodes 3 is placed directly in the vacuum chamber 1. The vacuum chamber 1 is closed by a lid 12 and covered with a light and ultra-violet ray screening 13. The vacuum chamber 1 is then evacuated by the vacuum pump 5 and maintained at a vacuum of about 0.4 to 1.2 inches mercury absolute for an effective period of at least about 15 minutes, the gases given off from the cell housing 2 and the electrodes 3 being sucked off continually.

The electrolyte is first prepared by mixing 20 to 60 parts by weight of concentrated sulfuric acid with about 30 to 50 parts by weight of distilled water and 3 to 15 parts by weight of pulverulent silicic acid. This pulverulent salicic acid is produced by the polygenic method from silicon tetrachloride and is absolutely free from alkaline substances. Its degree of purity amounts to 99.9% and its micron particle size may be 5–20μ. However, it may be prepared by various processes, and is sold in Great Britain as a sub-micron silica powder under a number of registered trademarks, such as "Aerosil" and "Manosil VN 3." As in British Patent No. 785,848, a sutable colloidal electrolyte may be made by mixing 11 to 15 grams of sub-micron "Aerosil" with 100 millilitres of dilute sulfuric acid, or 30 to 40 grams of sub-micron "Manisol VN 3" with this quantity of acid. The electrolyte thus prepared is a thixotropic mixture which can be produced and stored in large quantities without any difficulty. A quantity of the prepared electrolyte corresponding to the filling of the battery housing is introduced into the high-speed mixer 6 and intensively mixed for about 10 to 15 minutes with exclusion of air and thereby again liquefied. This means that the high-speed mixer 6 charged with the electrolyte is set in operation practically simultaneously with the evacuation of the vacuum chamber 1 but the valve 11 is closed during this period.

To prevent the air present in the high-speed mixer 6 from becoming mixed in the electrolyte, the high-speed mixer 6 can also be evacuated during or shortly before the mixing operation. By this means the electrolyte is also subjected to a cleansing process during the mixing operation.

However, it is also possible to evacuate the high-speed mixer 6 filled with the electrolyte before initiating the mixing operation and to fill it with an inert gas through the connecting piece 9, whereby this gas becomes partly mixed with the electrolyte during the mixing operation.

As the commencement of the vacuum treatment and the mixing operation are so synchronized that they terminate at the same time, it is only necessary to close the valve 4 and open the valve 11 at the end of the vacuum treatment period. The electrolyte intimately mixed and liquefied with exclusion of air, then flows through the pipe conduit 10 into the battery housing 2 placed in the vacuum chamber 1 and clings closely to the battery plates. When the battery housing 2 is completely filled with the electrolyte, the valve 11 can be again closed. The chamber 1 is then ventilated by means of an air inlet not shown in the drawing. Thereby the incoming air improves the bond between the electrolyte and the battery plates when it bears with pressure on the surface of the electrolyte.

The electrolyte can be introduced into the battery housing even with the valve 4 open. This is particularly advantageous when the electrolyte has absorbed appreciable quantities of inert gas or the like while being treated in the high-speed mixer 6. This gas then serves as a rinsing gas which, on the electrolyte entering the vacuum chamber 1, is sucked out of the electrolyte and in the process carries impurities with it. Particularly favourable results can be attained with the method according to the invention if the vacuum treatment of the battery electrodes 3 and the filling of electrolyte is carried out with screening against light and ultra-violet rays.

After the electrolyte has been filled into the battery housing 2, the latter is allowed to settle for at least 8 hours and the liquid which forms during the ageing is poured off. Then the battery is sealed in the usual gas and liquid-tight manner.

The lead electrodes used for the batteries according to the invention are preferably chosen relatively thin so that a good ratio is obtained between the surface and weight. All portions of these relatively thin lead electrodes are also far more fully exposed to the vacuum treatment than relatively thick electrodes. The forming operation of the electrodes 3 is preferably carried so far that the active composition of the positive electrode is completely converted into lead oxide and the active composition of the negative electrode is completely converted into lead sponge. The formed or sulfuric acid pre-treated electrodes should be introduced into the vacuum chamber as quickly as possible after the acid has been poured off so as to prevent the electrodes from absorbing carbon dioxide or other gases in the interval.

As it has not hitherto been possible to produce with any known methods dry batteries in which the dry electrolyte does not form any cracks nor shrink when stored for a longer period, the dry batteries produced according to the invention possess considerable advantages over all former batteries based on sulfuric acid and silicic acid. Above all the invention enables for the first time the fundamental advantages obtained by the dry batteries to be fully utilized. These advantages consist in that the battery can be stored in any position, is immune to vibration and cannot produce short circuits and presents no transport difficulties. As practically no gases are generated during the charging of the battery, it can be completely closed. By the method according to the invention the high-purity dry electrolyte is particularly well protected against colloidal action with the result that the self-discharge is less than in the case of conventional sulfuric acid batteries. The dry batteries produced according to the invention, being very insensitive to vacuum and pressure, are particularly well suited for use in aircraft, rockets and also in submarines.

I claim:

1. Method of producing secondary dry cells with lead electrodes and thixotropic sulfuric acid electrolyte which contains in addition to sulfuric acid a colloidally dispersed silicic acid with a purity degree of substantially 99.9%, consisting in subjecting the electrodes placed in the cell housing, immediately after they have undergone a pre-treatment with diluted sulfuric acid, to a vacuum for a predetermined effective period during which there is continuous exhaustion of the gases liberated, liquifying the high-purity thixotropic electrolyte composed of diluted sulfuric acid and the said colloidally dispersed silicic acid in a high-speed mixer, introducing the liquified electrolyte into the cell housing placed in the evacuated space, and thereafter subjecting the introduced electrolyte to atmospheric pressure.

2. Method according to claim 1, wherein there is the added step of forming the electrodes by the pre-treatment in diluted sulfuric acid, said step being immediately followed by the vacuum treatment.

3. Method according to claim 1, wherein in the case of formed, dried electrodes, the pre-treatment consists in an additional dipping into diluted sulfuric acid immediately preceding the vacuum treatment.

4. Method according to claim 1, wherein the vacuum treatment takes place at about 0.4 to 1.2 inches mercury absolute.

5. Method according to claim 1, wherein the vacuum treatment is carried out with screening against light and ultra-violet rays.

6. Method according to claim 1, wherein there is the added step of subjecting the electrolyte to intensive stirring and mixing before it is introduced into the cell housing placed in a vacuum chamber.

7. Method according to claim 6, wherein the stirring and mixing operation is maintained for a period of about 15 minutes.

8. Method according to claim 6, wherein the stirring and mixing operation is carried out with extensive exclusion of air.

9. Method according to claim 6, wherein the stirring and mixing operation takes place under vacuum.

10. Method according to claim 6, wherein the stirring and mixing operation is carried out in an atmosphere of an inert gas.

11. The method of producing secondary dry cells of the type having a cell housing and contained therein lead-containing electrodes and "dry" sulfuric acid electrolyte of the kind which contains, in addition to the sulfuric acid, colloidally dispersed particles of silicic acid having a purity of substantially 99.9%, which method consists in forming the electrodes in dilute sulfuric acid to convert them respectively to lead oxide and lead sponge, allowing the electrodes to dry, dipping the dried formed electrodes in dilute sulfuric acid carried in the cell housing, removing the dilute sulfuric acid from the housing and electrodes and immediately thereafter subjecting the electrodes to a vacuum of from 0.4 to 1.2 inches of mercury absolute for at least 15 minutes while continuously exhausting gases given off by the electrodes, subjecting a "dry" electrolyte to high speed mixing for about 15 minutes to liquify the same and simultaneously excluding air therefrom and supplying an inert gas thereto, introducing the liquified electrolyte into the cell housing in which the electrodes are disposed, subjecting the liquified electrolyte in the cell housing to atmospheric pressure, and screening the cell housing against light and ultra-violet rays during both the subjecting of the electrodes to the vacuum and the filling in of the electrolyte in the cell.

References Cited by the Examiner

UNITED STATES PATENTS

| | | | |
|---|---|---|---|
| 1,539,342 | 5/25 | Williams | 23—182 |
| 2,748,034 | 5/56 | Bobal | 204—294 |
| 2,820,728 | 1/58 | Burns | 204—294 |

FOREIGN PATENTS

| | | |
|---|---|---|
| 785,848 | 11/57 | Great Britain. |
| 630,182 | 10/49 | Great Britain. |
| 507,035 | 6/38 | Great Britain. |
| 336,113 | 10/30 | Great Britain. |

JOHN H. MACK, *Primary Examiner.*

JOHN R. SPECK, *Examiner.*